(12) United States Patent
Zhang et al.

(10) Patent No.: US 9,774,533 B2
(45) Date of Patent: Sep. 26, 2017

(54) MECHANISMS TO SUPPORT SERVICE CHAIN GRAPHS IN A COMMUNICATION NETWORK

(71) Applicant: Futurewei Technologies, Inc., Plano, TX (US)

(72) Inventors: Hong Zhang, Palo Alto, CA (US); Henry Fourie, Pleasanton, CA (US)

(73) Assignee: Futurewei Technologies, Inc., Plano, TX (US)

( * ) Notice: Subject to any disclaimer, the term of this patent is extended or adjusted under 35 U.S.C. 154(b) by 315 days.

(21) Appl. No.: 14/588,776

(22) Filed: Jan. 2, 2015

(65) Prior Publication Data
US 2016/0043952 A1    Feb. 11, 2016

Related U.S. Application Data

(60) Provisional application No. 62/034,075, filed on Aug. 6, 2014.

(51) Int. Cl.
*G06F 15/16* (2006.01)
*H04L 12/801* (2013.01)
*H04L 29/08* (2006.01)

(52) U.S. Cl.
CPC ............. *H04L 47/10* (2013.01); *H04L 67/16* (2013.01)

(58) Field of Classification Search
CPC .................................. H04L 47/10; H04L 67/16
USPC .................................. 709/223; 370/230–231
See application file for complete search history.

(56) References Cited

U.S. PATENT DOCUMENTS

| | | | | |
|---|---|---|---|---|
| 6,801,530 B1 * | 10/2004 | Brandt | ............... | H04L 12/2602 370/392 |
| 7,554,983 B1 * | 6/2009 | Muppala | ............. | H04L 41/0896 370/392 |
| 2008/0130497 A1 * | 6/2008 | Sang Wan | ............. | H04L 43/026 370/230.1 |
| 2011/0055845 A1 | 3/2011 | Nandagopal et al. | | |
| 2012/0230343 A1 * | 9/2012 | Schrum, Jr. | ......... | H04L 12/5692 370/401 |
| 2013/0124708 A1 | 5/2013 | Lee et al. | | |

FOREIGN PATENT DOCUMENTS

| | | |
|---|---|---|
| CN | 101179511 A | 5/2008 |
| CN | 103929492 A | 7/2014 |

* cited by examiner

*Primary Examiner* — David Lazaro
*Assistant Examiner* — Berhanu Shitayewoldetsad
(74) *Attorney, Agent, or Firm* — Slater Matsil, LLP (57) ABSTRACT

A novel scheme is defined for supporting service graphs to allow specific service functions to be applied to selected subsets of packet flows. According to one or more embodiments, a service graph is modeled as chains or sequences of "flow steering entities" and "service instances." According to an embodiment, a flow steering entity (FSE) is configured to identify the flow, and select the next hop service instance in the chain. After a service instance returns the flow packet, the FSE steers the packet to the next FSE in the graph. An initial FSE is used to select matching traffic to enter the service graph. Wherever path forking and merging is required in the service graph, additional classifiers are positioned with the FSE to steer a subset of traffic along different paths of service function instances.

19 Claims, 8 Drawing Sheets

Exemplary Computer System 800

Figure 8

MECHANISMS TO SUPPORT SERVICE CHAIN GRAPHS IN A COMMUNICATION NETWORK

CROSS REFERENCE TO RELATED APPLICATIONS

This application claims priority to U.S. Provisional Application 62/034,075, filed Aug. 6, 2014 to Zhang et al., and which is incorporated herein by reference in its entirety and for all purposes.

TECHNICAL BACKGROUND

Recent developments of Software Defined Networking and Network Function Virtualization technologies have introduced new approaches to deploy advanced services in a variety of network implementations such as data centers, mobile networks, and even enterprise and carrier networks.

One such approach to composing these advanced services is called service chaining. Service chaining is the method of applying a set of services to a packet flow between two endpoints. A specific service such as a firewall or Network Address Translation (NAT), may be provided through a hardware appliance or as an instance of a software application running on a virtual machine (VM).

Network virtualization in data centers and mobile networks has led to an increasing need for dynamic service chains with service instances that are deployed on virtual machines. A service chain is formed by routing the packet flow between the virtual machine of one service instance to the virtual machine of the next instance in the service chain. However, existing service chaining is relatively static and tightly coupled to already deployed network topology and physical resources, which are often difficult and/or costly to change. While network virtualization offers the ability to perform dynamic service chaining, unfortunately, few network equipment manufacturers offer these capabilities and none offer complex service graph branching and re-arrangement.

Moreover, the service chain implementations that are used in practice typically have severe limitations. For example, currently there are no mechanisms adopted within the networking industry capable of performing dynamic forking and re-arrangement of service chains, or modeling of service graphs. Instead, service graphs must be employed to split a traffic flow into multiple branches consisting of finer-grained flows so that specific differentiated services can be later applied to those flows. In addition, there is presently no conventional technique by which multiple streams of traffic can be merged to allow specific services to be applied to an aggregate flow.

Yet another challenge is to ensure that service graphs are acyclic so that there are no loops in the graph that would lead to service interruptions and degradation. Finally, there are no conventional solutions to support asymmetric service graphs, where different service paths are taken for forward and reverse data flow directions to allow different services to be applied to a packet flow in each direction. Likewise, conventional solutions are not capable of congruent forward and reverse direction service paths to support stateful service appliances in which case the forward direction and reverse direction must go through exactly the same service instance path.

SUMMARY OF THE INVENTION

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Accordingly, a solution to the problems and challenges inherent to the conventional service chain techniques described above, mechanisms are described herein to support multi-path service graphs to cover a broader range of usage scenarios. According to an aspect of the present disclosure, a flexible system is provided to construct and manage both symmetric and asymmetric service function graphs between groups of endpoints including provider and consumer endpoints.

According to another aspect of the present disclosure, a novel scheme is defined for supporting service graphs to allow specific service functions to be applied to selected subsets of packet flows. According to one or more embodiments, a service graph is modeled as chains or sequences of "flow steering entities" comprising service instances and classifiers. According to an embodiment, a flow steering entity (FSE) is configured to identify the flow, and select the next hop service instance in the chain. After a service instance performs its inherent function and returns the flow packet, the FSE steers the packet to the next FSE in the graph. An initial FSE is used to select matching traffic to enter the service graph. Wherever path forking and merging is required in the service graph, additional classifiers are positioned with the FSE to steer a subset of traffic along different paths of service function instances.

According to another aspect of the present disclosure, a method is provided for managing service chain branching and merging to create flexible service graphs. One or more aspects of the claimed subject matter provide the ability to create more complex service graphs that can be tailored to the service policies required by data center operators and mobile network operators and their customers.

BRIEF DESCRIPTION OF THE DRAWINGS

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

DETAILED DESCRIPTION

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known processes, procedures, components, and circuits have not been described in detail as not to unnecessarily obscure aspects and features of the subject matter.

Portions of the detailed description that follow are presented and discussed in terms of a process. Although steps and sequencing thereof are disclosed in figures herein describing the operations of this process, such steps and sequencing are exemplary. Embodiments are well suited to performing various other steps or variations of the steps recited in the flowchart of the figure herein, that not all of the steps depicted may be performed, or that the steps may be performed in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Service Graphs

The claimed subject matter provides a mechanism for supporting service graphs to allow specific service functions to be applied to selected subsets of packet flows. In one or more embodiments, a service graph is modeled as chains or sequences of "flow steering entities" (FSEs) that include service instances and one or more classifiers.

Figure 1:
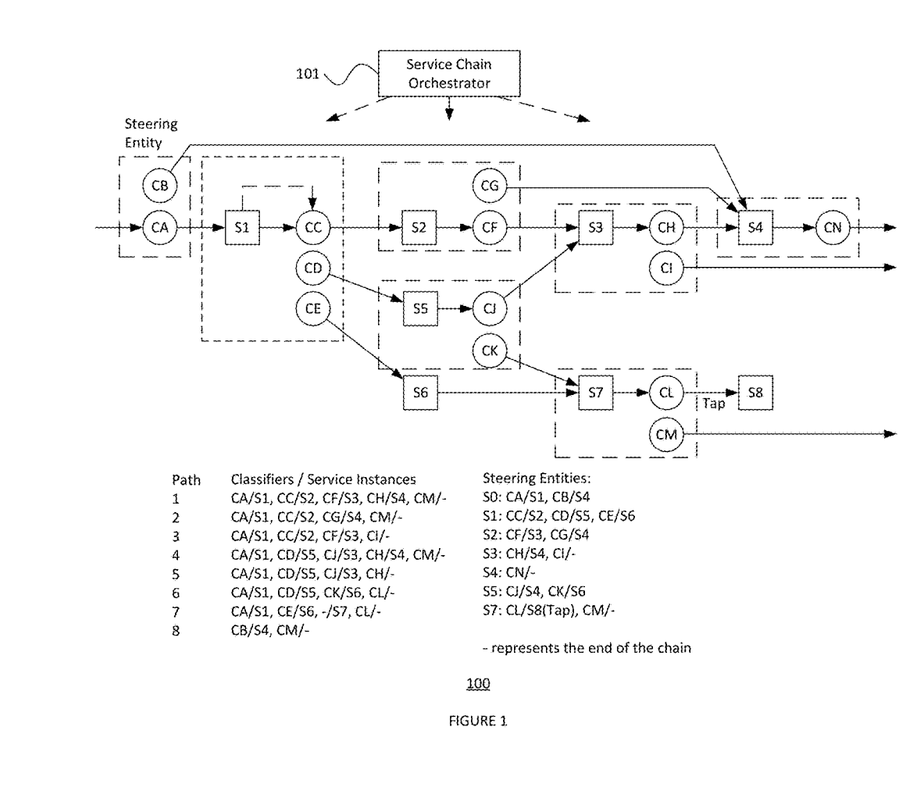
FIG. 1 depicts an exemplary service graph, in accordance with embodiments of the present invention.

FIG. 1 depicts an exemplary service graph 100, in accordance with embodiments of the present disclosure. As depicted in FIG. 1, FSEs are presented as a collection of service instances and classifiers, and identified by a dashed line box. Classifiers in service graph 100 are identified with a C prefix (e.g., CA, CB, CC, . . . CN), with a flow steering entity being comprised by 0, 1, or multiple classifiers. Service function instances are identified in service graph 100 with an S prefix (e.g., S1, S2, S3, . . . S8). Classifiers (e.g., CA, CB, CC, . . . CN) associated with a flow steering entity identify the packet flow and direct matching traffic along different paths to various specific downstream service function instances (e.g., S1, S2, S3, . . . S8).

According to one or more embodiments, wherever path forking and merging are required in the service graph, additional classifiers may be positioned with the FSE to steer a subset of traffic along different paths of service function instances or to steer aggregated traffic along a shared path. For example, as depicted in FIG. 1, the classifiers {CC, CD, CE} follow service instance S1 and matching traffic (e.g., data packets with matching metadata) is steered to service instances S2, S5 and S6 respectively, depending on the values of the metadata. On the other hand, downstream service instances can act as merge points for upstream classifiers. For example, service instance S3 merges traffic from classifiers CF and CJ. In one or more embodiments, a steering entity's forwarding operation may be controlled either by a local load balancer or from a centralized service orchestrator 101 as shown in FIG. 1.

There may be cases where no branching is required and one service instance is steered directly to a successor service instance. For example, traffic from service instance S6 goes directly to S7 in FIG. 1. In one or more embodiments, an initial FSE is used to select matching traffic to enter the service graph.

Figure 2:
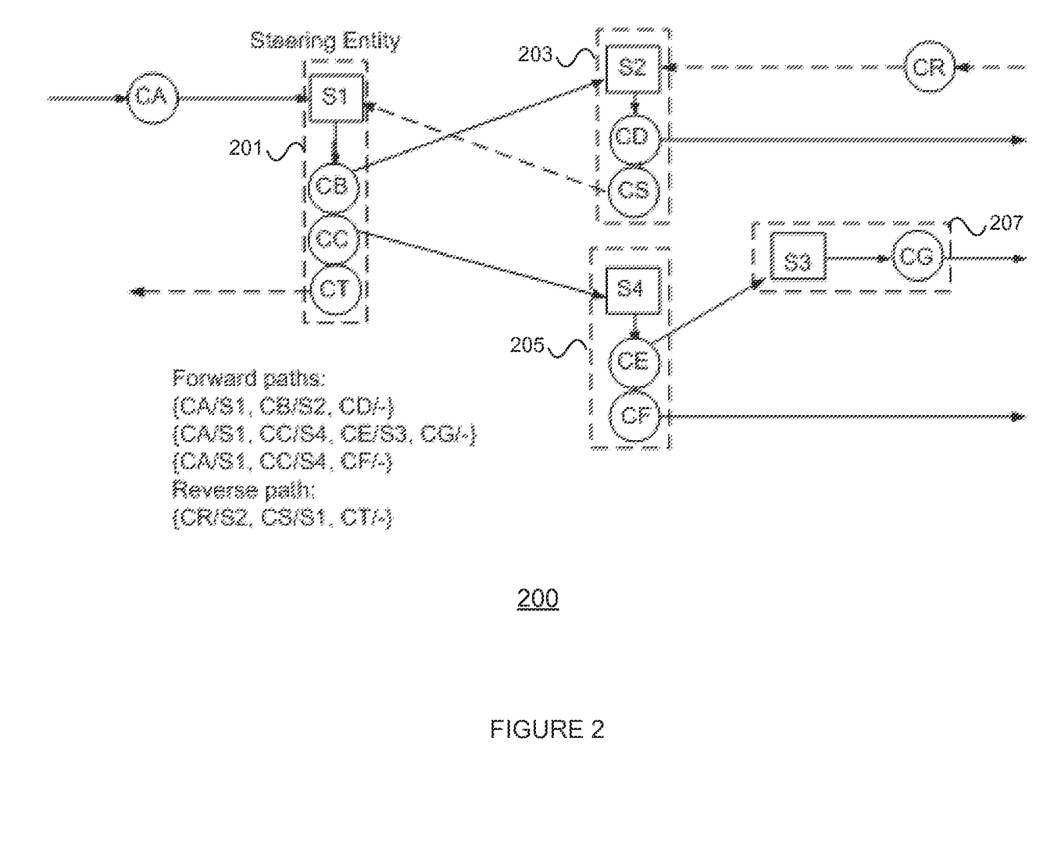
FIG. 2 depicts an exemplary steering set for a service instance that includes classifiers for steering traffic in both forward and reverse directions, in accordance with embodiments of the present invention.

According to further embodiments, a separate logical service graph may be constructed for the reverse direction of traffic flow. FIG. 2 depicts such a service graph 200. As depicted in FIG. 2, the steering entity for each service instance may include classifiers for steering the traffic in both the forward direction and the reverse direction based on the different source and destination addresses in the packets. For example, while the service graph 100 in FIG. 1 is depicted with traffic (indicated by the arrow heads) traveling in a unilateral direction, service graph 200 in FIG. 2 is depicted with traffic moving in the forward (solid line arrows) and reverse (dashed line arrows) directions. As depicted in FIG. 2, for example, data packets received in steering entity 201 are directed to the service instance of steering entity 203 if the meta data of the data packets match classifier CB, and are directed to the steering entity 205 if the meta data of the data packets match classifier CC, where the data packets may be forwarded eventually on to a third flow steering entity 207 if the data packets also include meta data that matches classifier CE. In the reverse direction, data packets received in steering entity 203 that include meta data matching classifier CS are directed to FSE 201.

Figure 3:
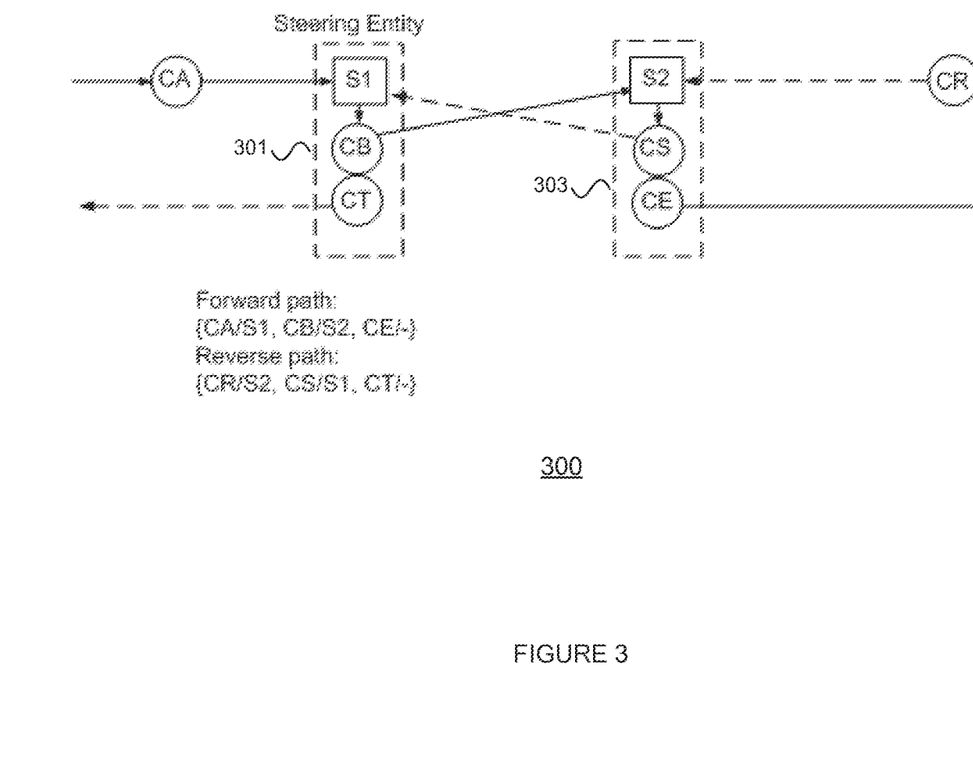
FIG. 3 depicts an exemplary steering set where a forward and a reverse path traverses the same service instances in reverse order, in accordance with embodiments of the present invention.

In still further embodiments, congruent service paths can also be constructed where a forward and a reverse path traverse the same service instances in reverse order. FIG. 3 depicts an exemplary steering graph 300 where a forward path and a reverse path traverse the same service instances but in reverse order. As depicted in FIG. 3, the service graph 300 may be implemented as a pair of congruent service paths. As presented in service graph 300, FSE 301 directs forward matching traffic to FSE 303, which in turn directs reverse matching traffic to FSE 301.

According to one or more embodiments, a classifier may also act as a tap point where the packet flow is replicated and sent to the tap service instance. The original packet stream entering this type of classifier is passed unchanged to the next classifier associated with the steering entity. For example, the tap at classifier CL of FIG. 1 replicates the packets received and sends them on to packet monitoring service instance S8. The original packet stream is passed unchanged to the next classifier CM.

Figure 4:
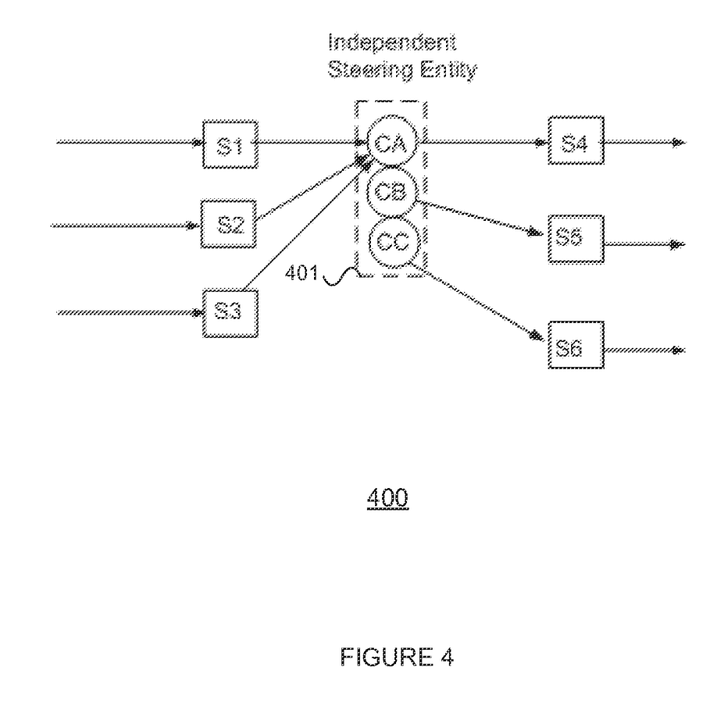
FIG. 4 depicts an exemplary configuration for an independent steering entity in a service graph, in accordance with embodiments of the present invention.

In one or more embodiments, a steering entity may or may not be co-located with the service instance. FIG. 4 depicts an exemplary configuration of a portion of a service graph 400. As depicted in FIG. 4, a steering entity 401 that is independent from a service instance (S1, S2, S3, . . . S8) has its own network address and may be shared by several service instances. This type of steering entity may be used with legacy service appliances, for example.

In one or more embodiments, the service graph is managed at a domain level by a service graph orchestrator via a control plane channel or locally by a load balancer (the orchestrator may configure or program the local load balancer with some policy and let the local load balancer do the selection). The service graph orchestrator may be executed by a computing device in the service chain network, for example. In one or more embodiments, the service orchestrator is further configured to verify that a service graph is acyclic. For example, a loop count in the packet metadata can be used to detect any cycles in a graph during operation.

According to one or more embodiments, service graph orchestrators may also be able a modify the service graph, either by adding or removing FSEs (branch points). To create a branch point, a new classifier is placed at that branching point and is associated with a steering entity. The orchestrator installs classification rules to the new classifier. The orchestrator will also program the steering entity with the next hop steering address of the downstream service instance. In one or more embodiments, the orchestrator may add, modify, and remove classifiers associated with a steering entity dynamically as needed by the service graph.

Classifiers may use any data fields in a data packet for matching, including the L2, L3, L4 and L7 fields. In addition, the content of the packet payload may also be used for matching by using deep packet inspection techniques. Packet metadata present in a packet may also be used for classification.

When a service graph is created, a service graph orchestrator may specify the following key pieces of information via a control channel at each classification point in the graph:

the next hop service instance address associated with each classifier in the steering entity at each branch point in the graph;

n-tuple flow descriptors that the classifiers can use to match incoming packets;

filters that the classifiers can use to match metadata present in incoming packets;

packet diversion or replication at each classifier;

metadata that may be inserted into outgoing packets for each branch; and the address of an independent non co-located steering entity associated with each service instance.

Figure 5:
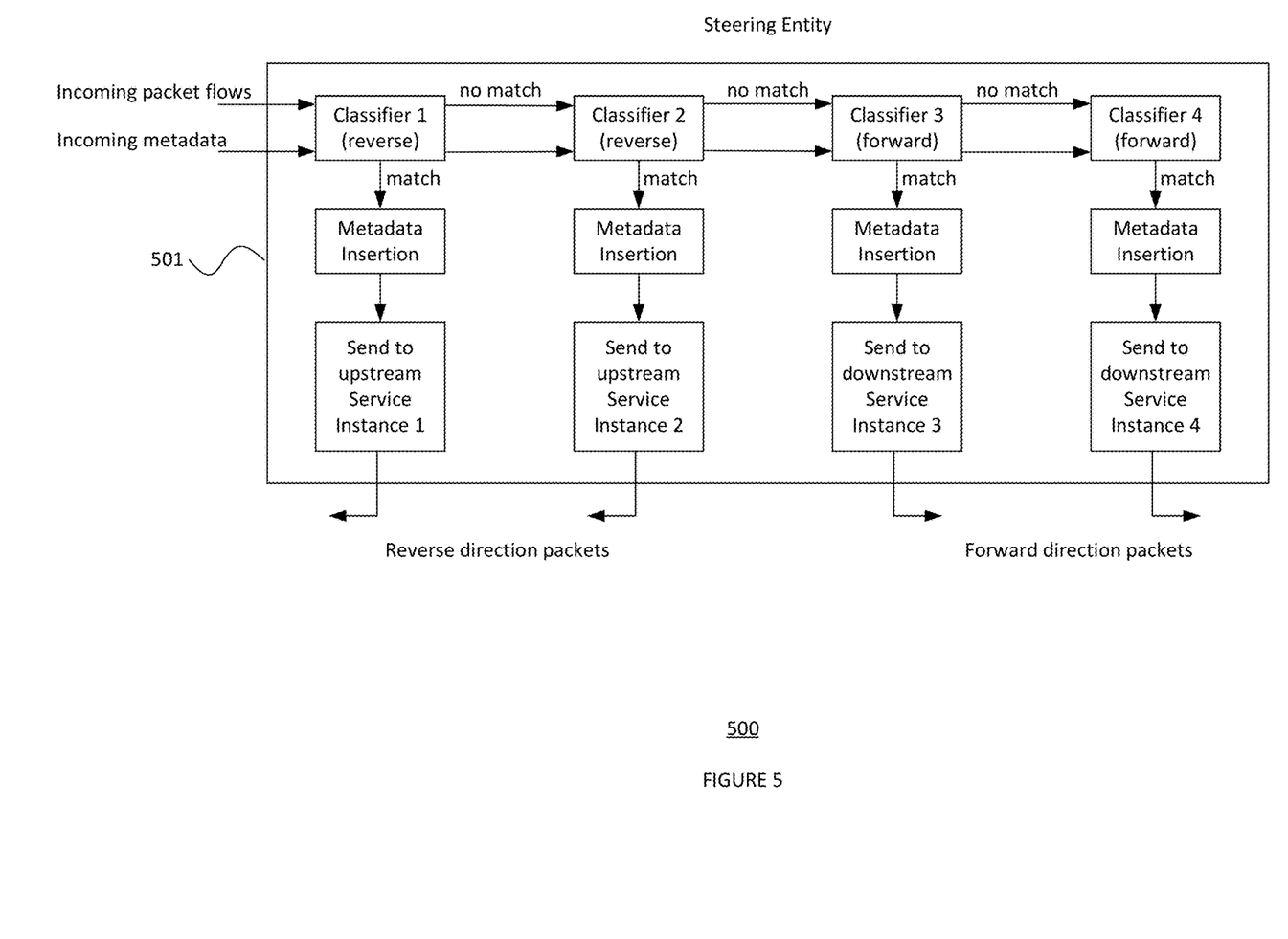
FIG. 5 depicts an exemplary steering flowchart based on classifiers of incoming packet flows in a service graph, in accordance with embodiments of the present invention.

According to one or more embodiments, each steering entity may associate with multiple classifiers with each having its own unique set of classification rules. In one or more embodiments, the classifiers associated with the steering entity may be evaluated ad hoc, one-by-one in the order of occurrence in the list as depicted in flowchart 500 of FIG. 5. As shown in FIG. 5, a steering entity receives incoming packet flows. The metadata of the packets in the data flow are inspected to determine a correspondence with any classifiers at that steering entity. When a match occurs, that corresponding branching path is taken and no further matching is done using other classifiers associated with the steering entity. If two classifiers associated with the steering entity have overlapping classification criteria, precedence in the list (determined and/or managed by the orchestrator) determines which classifier results in a match.

In one or more embodiments, classifiers may also be configured to perform replication. According to such embodiments, if a classifier is configured to perform replication, one set of packets is sent to the downstream service instance and the other set of packets is passed on to the next classifier in the steering entity.

Figure 6:
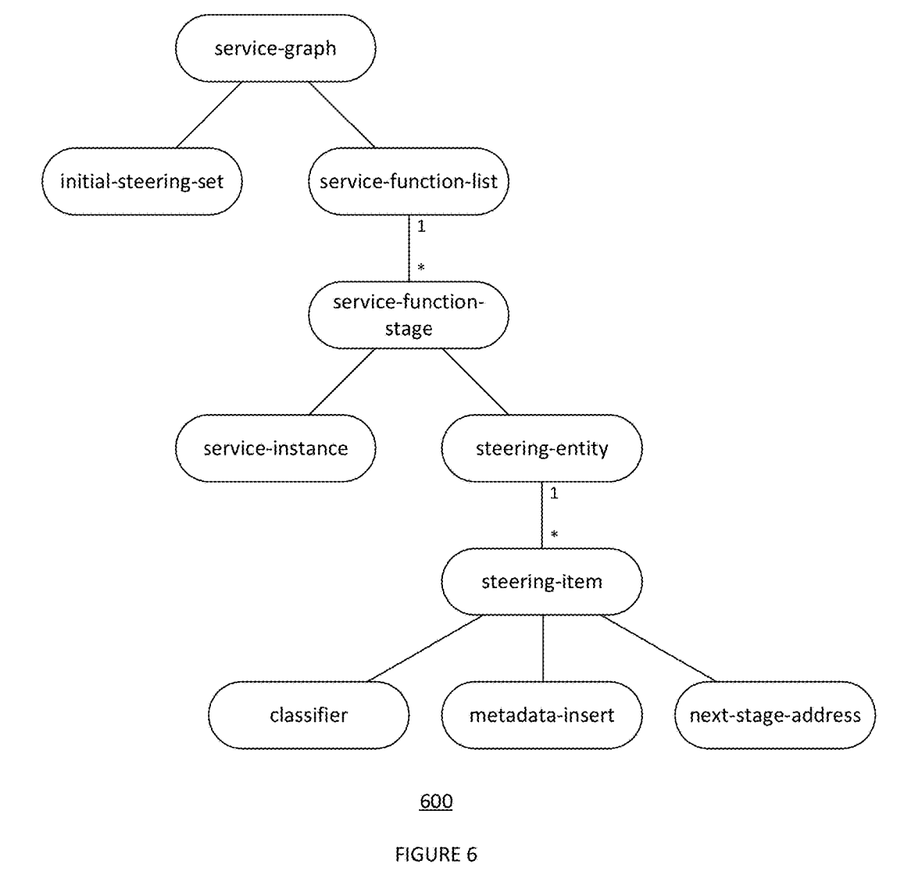
FIG. 6 depicts an exemplary syntax tree representing a service graph, in accordance with embodiments of the present invention.

A service graph may be represented using a specified syntax. FIG. 6 depicts an exemplary syntax tree 600. As depicted in FIG. 6, the syntax may be expressed as:

service-graph::=initial steering-entity, service-function-list service-function-list::={service-function-stage} service-function-stage::=service-instance, steering-entity steering-entity::={steering-item} steering-item::=classifier, metadata-insert, next-stage-address classifier::=n-tuple, metadata-match.

Where { . . . } indicates a multiplicity of the enclosed items, and comma-separated items are composed and assigned to an aggregate item.

As depicted in FIG. 6, a service graph includes an initial steering entity and a service function list as elements. A service function list includes a set (e.g., one or more) of service function stages as elements. A service function stage includes a service instance and a steering entity. A steering entity includes one or more steering items, with each steering item being a classifier, a metadata of insert/inspection capabilities, and the address of the next service function stage, as configured by the orchestrator of the service graph.

Figure 7:
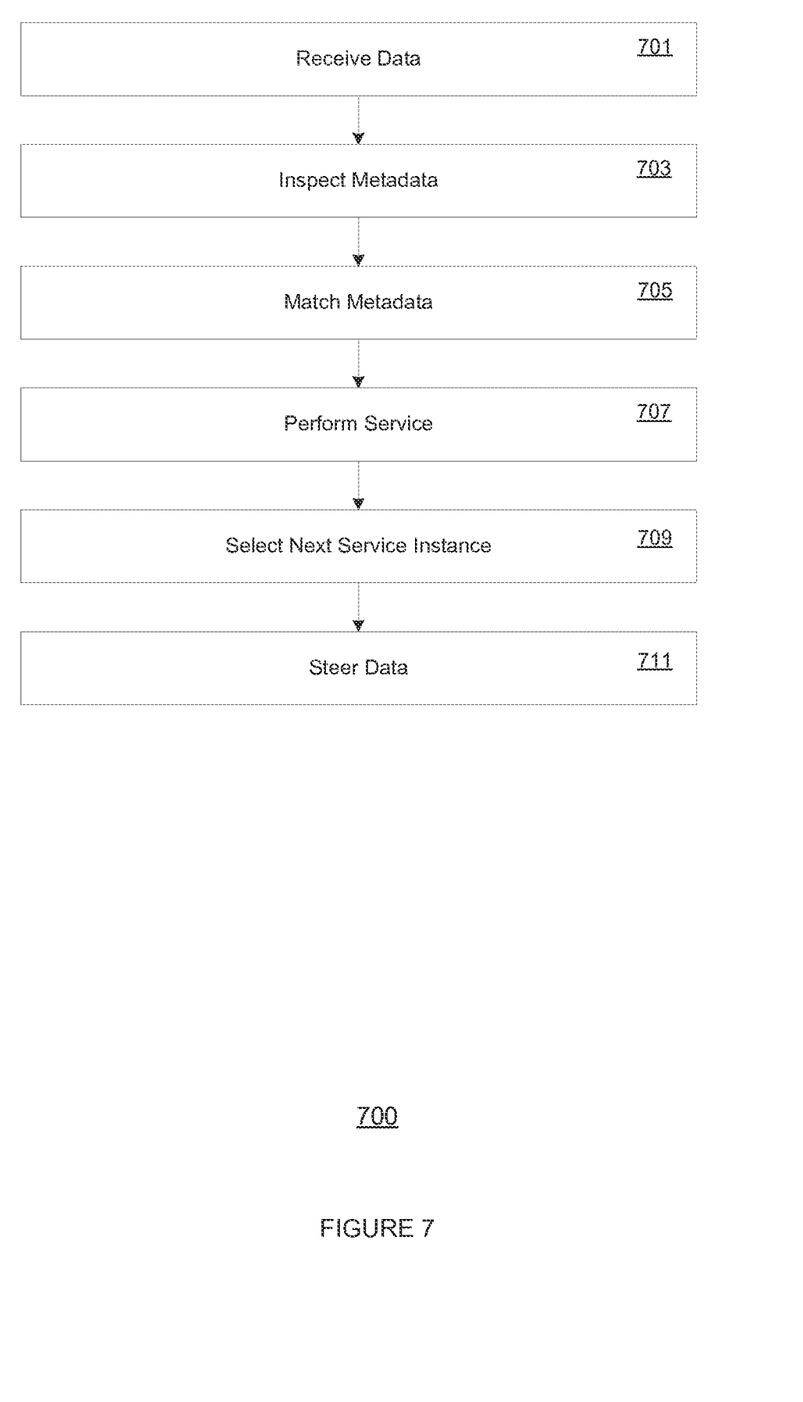
FIG. 7 depicts an exemplary flowchart of a method for steering packet flows in a network according to a service graph, in accordance with embodiments of the present invention.

FIG. 7 depicts a flowchart 700 for an exemplary process for directing data flows in a service chain according to a service graph, in accordance with embodiments of the present disclosure. In one embodiment, the process 700 is implemented in whole or in part as computer-executable instructions stored in a computer-readable medium and executed by a processor in a computing device.

At step 701, a flow of data packets is received as input in a flow steering entity of a service graph. In one or more embodiments, the flow steering entity may be implemented to include an instance of a service function and one or more classifiers. At step 703, metadata comprised in the flow of data packets is inspected to determine if the metadata matches one or more classifiers associated with the flow steering entity. Inspection may include, for example, examining data fields of the data packet.

At step 705, the metadata comprised in the flow of data packets is matched to at least one classifier associated with the flow steering entity. Where more than one classifier associated with the flow steering entity is matched to data in the flow of data packets, a priority table is referenced to determine the classifier with highest priority. In one or more embodiments, the priority table is generated at a service orchestrator and distributed by the service orchestrator to the flow steering entity.

At step 707, the service function corresponding to the flow steering entity is performed. The service function may include, for example, a software application, security services, network address translation, etc. At step 709, the next service instance in the service graph, as identified at step 705, is selected and the corresponding flow steering entity is identified for forwarding. Finally at 711, the flow of packets is steered to the address of the next service instance (and corresponding flow steering entity), where the process depicted in steps 701 to 711 is repeated.

In one or more embodiments, the next service instance in the service graph may comprise a previous service instance in a data path traveled by the flow of data packets (i.e., a reverse data path). In one or more embodiments, the flow steering entity may perform forking, wherein portions of the flow of data packets is directed to different next service instances.

In one or more further embodiments, load balancing may be performed by the flow steering entity to manage and control the forwarding of data to overloaded flow steering entities/service instances, or to direct packet flow to under-burdened flow steering entities/service instances. In still further embodiments, the flow steering entity may perform replication, whereby a classifier replicates a portion or entirety of a packet flow. In this case, the replication being sent to the next service instance as dictated by the classifier, with the original being diverted (or replicated again) by the next classifier at the flow steering entity.

Figure 8:
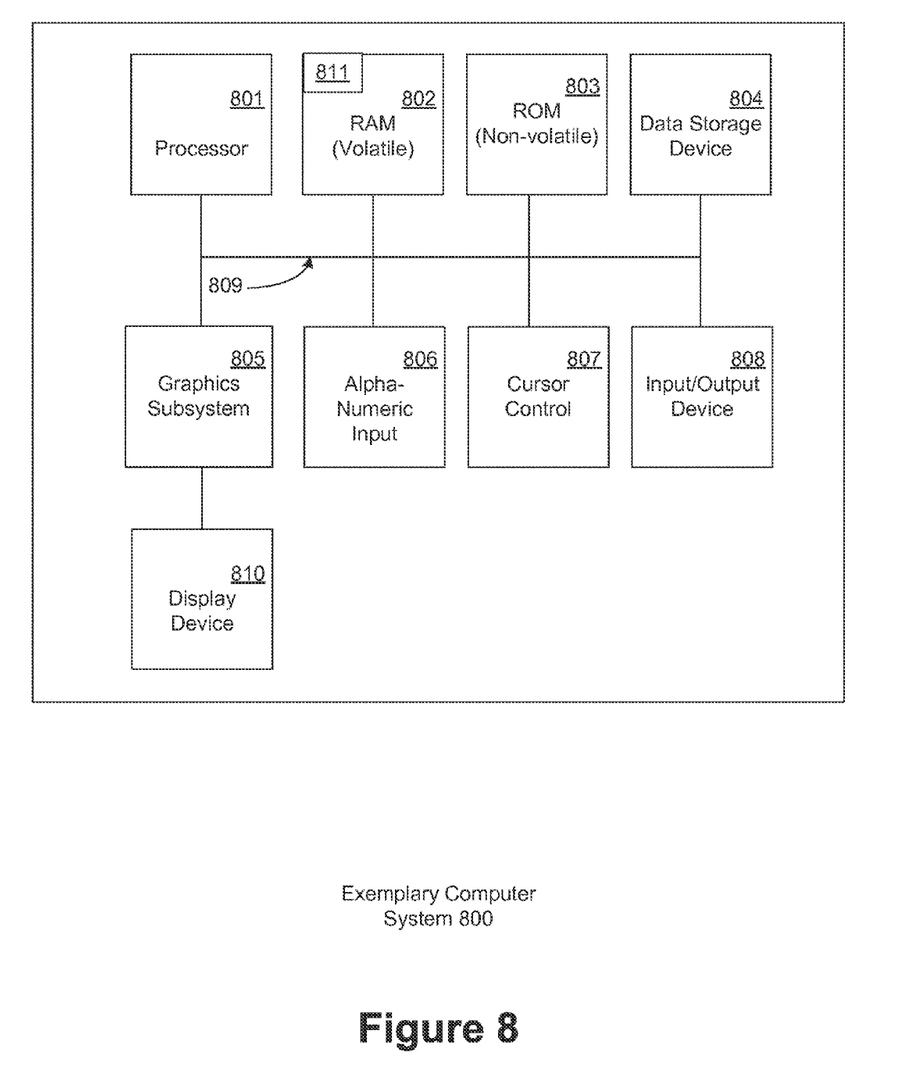
FIG. 8 depicts an exemplary computing environment upon which embodiments of the present disclosure may be implemented.

As presented in FIG. 8, an exemplary computing environment 800 is depicted, in accordance with embodiments of the present disclosure. In its general configuration, computing environment 800 typically includes at least one processing unit 801 and memory, and an address/data bus 809 (or other interface) for communicating information. Depending on the exact configuration and type of computing environment, memory may be volatile (such as RAM 802), non-volatile (such as ROM 803, flash memory, etc.), some combination of volatile and non-volatile memory, or other suitable device capable of storing for subsequent recall data and/or instructions executable on the processing unit 801. According to one or more embodiments, programmed instructions 811 stored in the memory of computing environment 800 may be executed by the processing unit 801 to perform service graph orchestration. In one or more embodiments, load balancing at one or more FSEs may also be performed by computing environment 800.

In some embodiments, computing environment 800 may also comprise an optional graphics subsystem 805 for presenting information to a user, e.g., by displaying information on an attached or integrated display device 810. Additionally, computing system 800 may also have additional features/functionality. For example, computing system 800 may also include additional storage (removable and/or non-removable) including, but not limited to, magnetic or optical disks or tape. Such additional storage is illustrated in FIG. 8 by data storage device 804. Computer storage media includes volatile and nonvolatile, removable and non-removable media implemented in any method or technology for storage of information such as computer readable instructions, data structures, program modules or other data. RAM 808, ROM 803, and data storage device 804 are all examples of computer storage media.

Computing environment 800 may also comprise a physical (or virtual) alphanumeric input device 806, an physical (or virtual) cursor control or directing device 807. Optional alphanumeric input device 806 can communicate information and command selections to central processor 801. Optional cursor control or directing device 807 is coupled to bus 809 for communicating user input information and command selections to central processor 801. As shown in FIG. 8, computing environment 800 also includes one or more signal communication interfaces (input/output devices, e.g., a network interface card) 808. The signal communication interface may function as a transceiver for the computing environment 800, and allow the transmission and reception of wireless data from one or more base stations.

Embodiments of the claimed subject matter provide methods and systems for flexible service graph creation and management to allow for dynamic service provisioning and re-arrangement. This claimed subject matter provides a new scheme for managing service graph branching and merging to create flexible service graphs. This claimed subject matter provides the ability to create more complex service graphs that can be tailored to the service policies required by data center and mobile network operators and their customers.

Through implementations of the claimed subject matter, differentiated services can be applied at a greater level of flow granularity as required by network virtualization. Other benefits provided by implementations of the claimed subject matter include: lowered operating expenses since time-consuming manual configuration is replaced by automatic provisioning; greater flow granularity that results in a significant reduction in the amount of traffic passing through a service appliance, thereby improving performance and lowering capital expenditures due to requiring fewer service appliances; agile deployment of services resulting in a reduction in service deployment time, enhanced service availability with the ability to dynamically configure services; and the ability to readily test and evaluate new services and service combinations, which allow service providers and their customers the ability to innovate and introduce new differentiated service offerings.

What is claimed is:

1. A computing device in a network of communicatively coupled computing nodes and operable to facilitate flows of data packets between computing nodes within the network, the computing device comprising: a memory, operable to store a plurality of programmed instructions; and a processor communicatively coupled to the memory and operable to execute the plurality of programmed instructions to implement a service graph by: determining a plurality of service instances performed at the plurality of computing nodes; associating one or more classifiers with each of the plurality of computing nodes; and generating a plurality of data paths on the service graph for flows of data packets to traverse the network based on the plurality of service instances performed at the plurality of computing nodes and based on the one or more classifiers associated with each of the plurality of computing nodes, each of the plurality of data paths on the service graph extending over a different sequence of computing nodes such that different services are applied to flows of data packets being forwarded over different data paths on the service graph, wherein a flow of data packets initially forwarded over a first data path on the service graph is dynamically re-directed over a second data path on the service graph at an intermediate computing node when a re-directing condition occurs, the first data path and the second data path diverging at the intermediate computing node.

2. The device according to claim 1, wherein the processor further implements the service graph by designating a computing node of the network as an initial computing node, wherein the initial computing node is configured to select matching traffic to enter the service graph.

3. The device according to claim 1, wherein the processor further implements the service graph by implementing path forking in the service graph.

4. The device according to claim 1, wherein the processor further implements the service graph by implementing merging for a subset of packet flows of the flows of data packets.

5. The device according to claim 1, wherein the one or more classifiers is configured to direct matching traffic along a data path on the service graph to a service instance of the plurality of service instances.

6. The device according to claim 5, wherein a service instance of the plurality of service instances is configured as a merge point.

7. The device according to claim 1, wherein the processor further implements the service graph by performing load balancing to manage forwarding operations performed by the computing device.

8. The device according to claim 1, wherein the processor further implements the service graph by distributing a plurality of classification rules and a plurality of load balancing policies to computing nodes of the network of communicatively coupled computing nodes.

9. The device according to claim 1, wherein at least one classifier is co-located in a computing node with a service instance.

10. The device according to claim 1, wherein at least one classifier is not co-located in a computing node with a service instance.

11. A method of implementing a service graph, the method comprising: receiving, by an intermediate computing node, a flow of data packets over a first data path on the service graph; inspecting metadata comprised in the flow of data packets; matching the metadata to a classifier associated with the intermediate computing node; performing a service on the flow of data packets corresponding to a service instance comprised in the intermediate computing node; and dynamically re-directing, by the intermediate computing node, the flow of data packets from the first data path on the service graph to a second data path on the service graph when a re-directing condition occurs, the first data path and the second data path diverging at the intermediate computing node, wherein the first data path extends over a different sequence of computing nodes than the second data path such that different services are applied to flows of data packets forwarded over the first data path than flows of data packets forwarded over the second data path.

12. The method of claim 11, further comprising performing merging of separate flows of data packets received over different data paths on the service graph.

13. The method according to claim 11, further comprising controlling a forwarding operation performed by the intermediate computing node in a local load balancer.

14. The method according to claim 11, wherein the classifier and the service instance are co-located.

15. The method according to claim 11, wherein the classifier and the service instance are not co-located.

16. The method according to claim 15, wherein and the classifier is shared by a plurality of service instances in the service graph.

17. A non-transitory computer readable medium comprising programmed instructions, which, when executed by a processor, is operable to implement a service graph in a network of communicatively coupled computing nodes, the programmed instructions comprising: instructions to receive, by an intermediate computing node, a flow of data packets over a first data path on the service graph; instructions to inspect metadata comprised in the flow of data packets; instructions to match the metadata to a classifier associated with the intermediate computing node; instructions to perform a service on the flow of data packets corresponding to a service instance comprised in the intermediate computing node; and instructions to dynamically re-direct, by the intermediate computing node, the flow of data packets from the first data path on the service graph to a second data path on the service graph when a re-directing condition occurs, the first data path and the second data path diverging at the intermediate computing node, wherein the first data path extends over a different sequence of computing nodes than the second data path such that different services are applied to flows of data packets forwarded over the first data path than flows of data packets forwarded over the second data path.

18. The non-transitory computer readable medium according to claim 17, wherein the classifier and the service instance are not co-located.

19. The non-transitory computer readable medium according to claim 17, wherein the classifier is shared by a plurality of service instances in the service graph.

* * * * *